United States Patent
Si et al.

(10) Patent No.: US 11,337,269 B2
(45) Date of Patent: May 17, 2022

(54) CELL PROCESSING METHOD, TERMINAL DEVICE, AND NETWORK DEVICE

(71) Applicant: VIVO MOBILE COMMUNICATION CO.,LTD., Guangdong (CN)

(72) Inventors: Ye Si, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 3 days.

(21) Appl. No.: 16/969,498

(22) PCT Filed: Jan. 31, 2019

(86) PCT No.: PCT/CN2019/074177
§ 371 (c)(1),
(2) Date: Aug. 12, 2020

(87) PCT Pub. No.: WO2019/154268
PCT Pub. Date: Aug. 15, 2019

(65) Prior Publication Data
US 2020/0413478 A1 Dec. 31, 2020

(30) Foreign Application Priority Data
Feb. 12, 2018 (CN) .......................... 201810146597.9

(51) Int. Cl.
*H04W 80/02* (2009.01)
*H04W 72/12* (2009.01)
(Continued)

(52) U.S. Cl.
CPC ........... *H04W 80/02* (2013.01); *H04L 5/0051* (2013.01); *H04L 5/0092* (2013.01);
(Continued)

(58) Field of Classification Search
CPC . H04W 80/02; H04W 80/08; H04W 72/1257; H04W 72/1205; H04W 72/1226;
(Continued)

(56) References Cited

U.S. PATENT DOCUMENTS

| | | | |
|---|---|---|---|
| 2011/0134774 A1 | 6/2011 | Pelletier et al. | |
| 2014/0050113 A1 | 2/2014 | Rosa et al. | |

(Continued)

FOREIGN PATENT DOCUMENTS

| | | |
|---|---|---|
| CN | 103503535 A | 1/2014 |
| CN | 105306187 A | 2/2016 |

(Continued)

OTHER PUBLICATIONS

EP Search Report in Application No. 19750738.7 dated Dec. 15, 2020.

(Continued)

*Primary Examiner* — Phong La
(74) *Attorney, Agent, or Firm* — Maschoff Brennan

(57) ABSTRACT

A cell processing method, a terminal device and a network device are provided. The cell processing method includes: sending MAC CE signaling to a terminal device, wherein the MAC CE signaling is used to activate an SCell; activating a downlink SP RS based on the MAC CE signaling; sending the downlink SP RS to the terminal device according to a transmission time of the downlink SP RS, wherein the downlink SP RS is used by the terminal device to activate the SCell.

20 Claims, 7 Drawing Sheets

(51) Int. Cl.
*H04L 5/00* (2006.01)
*H04W 80/08* (2009.01)

(52) U.S. Cl.
CPC ....... *H04L 5/0098* (2013.01); *H04W 72/1257* (2013.01); *H04W 80/08* (2013.01)

(58) Field of Classification Search
CPC ..... H04L 5/0051; H04L 5/048; H04L 5/0092; H04L 5/0091; H04L 5/0094; H04L 5/0096; H04L 5/0098
USPC ......................................................... 370/329
See application file for complete search history.

(56) References Cited

U.S. PATENT DOCUMENTS

| | | | |
|---|---|---|---|
| 2018/0076938 A1 | 3/2018 | Wang et al. | |
| 2018/0160421 A1 | 6/2018 | Suzuki et al. | |
| 2019/0174466 A1* | 6/2019 | Zhang | H04L 5/0048 |
| 2019/0207662 A1* | 7/2019 | Zhou | H04W 72/042 |
| 2019/0207737 A1* | 7/2019 | Babaei | H04W 24/08 |
| 2019/0260544 A1* | 8/2019 | Dou | H04W 72/0453 |
| 2020/0252192 A1* | 8/2020 | Gao | H04L 5/10 |
| 2020/0358493 A1* | 11/2020 | Hao | H04L 5/0051 |

FOREIGN PATENT DOCUMENTS

| | | |
|---|---|---|
| CN | 107534535 A | 1/2018 |
| CN | 107615857 A | 1/2018 |
| WO | 2014/018333 A2 | 1/2014 |

OTHER PUBLICATIONS

CN Office Action in Application No. 201810146597.9 dated Apr. 14, 2020.
"CSI-RS Design for NR" 3GPP TSG RAN WG1 NR Ad-Hoc Meeting, Jan. 16, 2017.
"Remaiining issues on other aspect of carrier aggregation" 3GPP TSG RAN WG1 Meeting 91, Nov. 27, 2017.
"Summary of remaining issues on CSI-RS" 3GPP TSG RAN WG1 Meeting #91, Nov. 27, 2017.
Written Opinion and International Search Report in Application No. PCT/CN2019/074177 dated Aug. 27, 2020.
Indian Office Action dated Sep. 15, 2021 as received in application No. 202027038455.

* cited by examiner

CELL PROCESSING METHOD, TERMINAL DEVICE, AND NETWORK DEVICE

CROSS-REFERENCE TO RELATED APPLICATION

The present application is the U.S. national phase of PCT Application No. PCT/CN2019/074177 filed on Jan. 31, 2019, which claims a priority of the Chinese patent application 201810146597.9 filed on Feb. 12, 2018, which are incorporated herein by reference in their entirety.

TECHNICAL FIELD

The present disclosure relates to the field of communications technologies, in particular to a cell processing method, a terminal device and a network device.

BACKGROUND

In a future-oriented 5th Generation (5 Generation, 5G) mobile communications system, in order to improve reliability of the 5G system, a frequency offset, a time offset, a Doppler frequency shift, a Doppler spread, a time-delay spread, and the like of the 5G system are required to be accurately estimated. At the same time, a case that reference signals may be always ON should be avoided in order to reduce signaling overhead, thus tracking reference signal (Tracking Reference Signal, TRS) may be introduced. At a receive end, channel parameters may be accurately estimated based on a periodic TRS, to improve accuracy of demodulation.

In order to improve spectral efficiency and meet a demand for a larger peak rate, carrier aggregation technology appears. The carrier aggregation refers to that two or more component carriers (Component Carriers, CC) are aggregated to support a larger transmission bandwidth. In specific implementations, each CC corresponds to an independent cell. Cells in carrier aggregation may be classified as Primary Cells (PCell) and Secondary Cells (SCell). The Pcell is a cell, established when a terminal device, such as a user equipment (User Equipment, UE), performs an initial connection and the Pcell is responsible for radio resource control (Radio Resource Control, RRC) communication with the UE. The SCell is added during RRC reconfiguration to provide additional radio resources. The PCell is always in an active state, the SCell may be in an active state or a deactivated state. In a case that the SCell needs to be activated, the SCell may be activated by demodulating media access control (Media Access Control, MAC) layer control element (Control Element, CE) signaling. The CE may also be referred to as a control granularity, and the like.

Specifically, when the SCell is activated, the UE needs to demodulate a received MAC CE signaling firstly, and then activate the SCell by using the demodulated MAC CE signaling. If a network-side device schedules a periodic TRS to perform time-frequency tracking on the SCell, the UE needs to receive the periodic TRS after the UE demodulates MAC CE signaling to perform time-frequency tracking on the SCell. After the time-frequency tracking is completed, the UE reaches synchronization with the SCell, and the SCell is actually activated.

However, since a TRS is periodic, the TRS does not necessarily exist after the MAC CE signaling is demodulated. In the absence of the TRS, the UE has to wait until the next TRS period to receive a TRS and use the TRS in the next TRS period to perform time-frequency tracking on the SCell, resulting in an increase in an activation delay of the SCell and a decrease in resource utilization.

BRIEF DESCRIPTION OF THE DRAWINGS

In order to more clearly illustrate the technical solutions in some embodiments of the present disclosure, the drawings used in some embodiments of the present disclosure will be briefly introduced below. Obviously, the drawings in the following description are only some embodiments of the present disclosure. Based on these drawings, other drawings may be obtained by a person of ordinary skill in the art.

DETAILED DESCRIPTION

Figure 1:
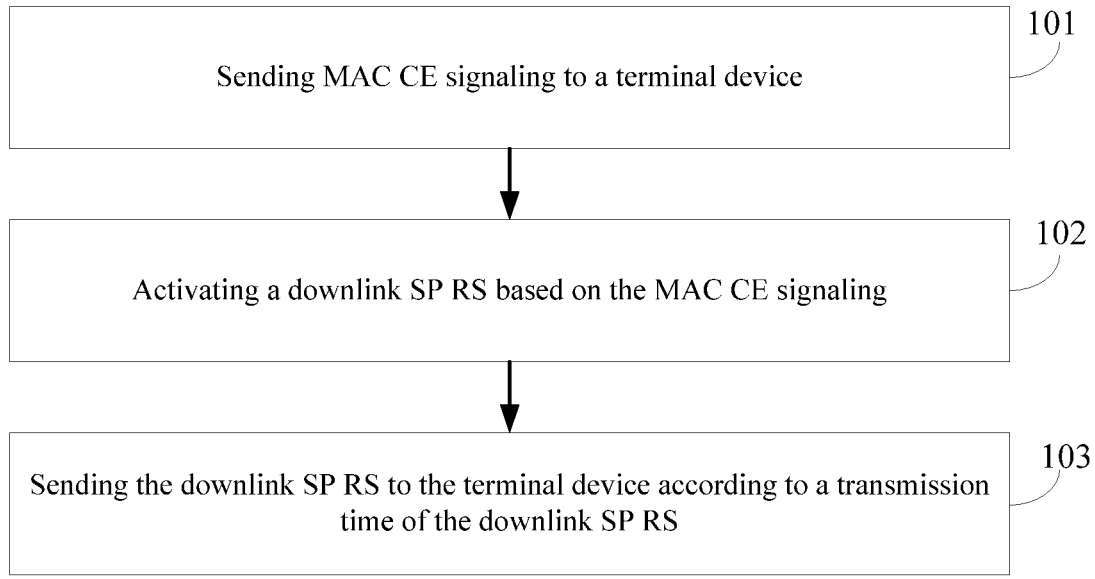
FIG. 1 is a flowchart of a cell processing method according to some embodiments of the present disclosure.

Some embodiments of the present disclosure provide a cell processing method, a terminal device and a network device, to solve a related problem of an increase in an activation delay of an SCell and a decrease in resource utilization caused by being unable to acquire a periodic signal in a timely manner in a case that the periodic signal is scheduled to activate the SCell.

In a first aspect, some embodiments of the present disclosure provide a cell processing method, and the method is applied to a network device and includes:

sending MAC CE signaling to a terminal device, wherein the MAC CE signaling is used to activate an SCell;

activating a downlink Semi-persistent Reference Signal (SP RS) based on the MAC CE signaling; and sending the downlink SP RS to the terminal device according to a transmission time of the downlink SP RS, wherein the downlink SP RS is used by the terminal device to activate the SCell.

In a second aspect, some embodiments of the present disclosure further provide a cell processing method, and the method is applied to a terminal device and includes:

receiving MAC CE signaling sent by a network device, wherein the MAC CE signaling is used to activate an SCell and a downlink SP RS;

determining a transmission time of the downlink SP RS;

receiving the downlink SP RS according to the transmission time of the downlink SP RS, the downlink SP RS being sent by the network device; and activating the SCell based on the downlink SP RS.

In a third aspect, some embodiments of the present disclosure further provide a cell processing method, and the method is applied to a network device and includes:

sending MAC CE signaling to a terminal device, wherein the MAC CE signaling is used to activate an SCell and an uplink SP RS;

receiving the uplink SP RS according to a transmission time of the uplink SP RS, the uplink SP RS being sent by the terminal device; and activating the SCell based on the uplink SP RS.

In a fourth aspect, some embodiments of the present disclosure further provide a cell processing method, and the method is applied to a terminal device and includes:

receiving MAC CE signaling sent by a network device, wherein the MAC CE signaling is used to activate an SCell;

activating an uplink SP RS based on the MAC CE signaling;

determining a transmission time of the uplink SP RS; and sending the uplink SP RS to the network device according to the transmission time of the uplink SP RS, wherein the uplink SP RS is used by the network device to activate the SCell.

In a fifth aspect, some embodiments of the present disclosure further provide a network device, and the network device includes:

a first sending module, configured to send MAC CE signaling to a terminal device, wherein the MAC CE signaling is used to activate an SCell;

a first activation module, configured to activate a downlink SP RS based on the MAC CE signaling; and a second sending module, configured to send the downlink SP RS to the terminal device according to a transmission time of the downlink SP RS, wherein the downlink SP RS is used by the terminal device to activate the SCell.

In a sixth aspect, some embodiments of the present disclosure further provide a terminal device, and the terminal device includes:

a first reception module, configured to receive MAC CE signaling sent by a network device, wherein the MAC CE signaling is used to activate an SCell and a downlink SP RS;

a first determination module, configured to determine a transmission time of the downlink SP RS;

a second reception module, configured to receive the downlink SP RS according to the transmission time of the downlink SP RS, the downlink SP RS being sent by the network device; and a first processing module, configured to activate the SCell based on the downlink SP RS.

In a seventh aspect, some embodiments of the present disclosure further provide a network device, and the network device includes:

a third sending module, configured to send MAC CE signaling to a terminal device, wherein the MAC CE signaling is used to activate an SCell and an uplink SP RS;

a third reception module, configured to receive the uplink SP RS according to a transmission time of the uplink SP RS, the uplink SP RS being sent by the terminal device; and a second processing module, configured to activate the SCell based on the uplink SP RS.

In an eighth aspect, some embodiments of the present disclosure further provide a terminal device, and the terminal device includes:

a fourth reception module, configured to receive MAC CE signaling sent by a network device, wherein the MAC CE signaling is used to activate an SCell;

a second activation module, configured to activate an uplink SP RS based on the MAC CE signaling;

a second determination module, configured to determine a transmission time of the uplink SP RS; and a fourth sending module, configured to send the uplink SP RS to the network device according to the transmission time of the uplink SP RS, wherein the uplink SP RS is used by the network device to activate the SCell.

In a ninth aspect, some embodiments of the present disclosure further provide a terminal device, and the terminal device includes: a storage, a processor and a computer program stored in the storage and configured to be executed by the processor, wherein, in a case that the processor is configured to execute the computer program, the processor implements steps of the cell processing method applied to a network device.

In a tenth aspect, some embodiments of the present disclosure further provide a network device, and the network device includes: a storage, a processor and a computer program stored in the storage and configured to be executed by the processor, wherein, in a case that the processor is configured to execute the computer program, the processor implements steps of the cell processing method applied to a terminal device.

In an eleventh aspect, some embodiments of the present disclosure further provide a computer readable storage medium storing therein a computer program, and the computer program is configured to be executed by a processor to implement steps of the cell processing method applied to a network device, or steps of the cell processing method applied to a terminal device.

In the cell processing method in some embodiments of the present disclosure, MAC CE signaling is sent to a terminal device, wherein the MAC CE signaling is used to activate an SCell and a downlink SP RS, the downlink SP RS is sent to the terminal device according to a transmission time of the downlink SP RS, so that the terminal device activates an SCell by using the downlink SP RS to complete activation of the SCell. The transmission time of the downlink SP RS is dynamically determined, thus, by activating the downlink SP RS with help of the MAC CE signaling and reasonably setting the transmission time of the downlink SP RS, the terminal device may acquire the downlink SP RS in time after the terminal device demodulates the MAC CE signaling. Therefore, an increase in activation time of the SCell is avoided, and a resource utilization rate is improved.

In order to more clearly illustrate the technical solutions in some embodiments of the present disclosure, the drawings used in some embodiments of the present disclosure will be briefly introduced below. Obviously, the drawings in the following description are only some embodiments of the present disclosure. Based on these drawings, other drawings may be obtained by a person of ordinary skill in the art. "And/or" used in the specification and claims means at least one of connected objects.

Referring to FIG. 1, some embodiments of the present disclosure provide a cell processing method, and the method is applied to a network device and includes the following steps.

Step 101: sending MAC CE signaling to a terminal device.

The MAC CE signaling is used to activate an SCell. After the terminal device receives the MAC CE signaling, the terminal device may first demodulate the MAC CE signaling, and send reception feedback to the network-side device; then, after the terminal device demodulates the MAC CE signaling, the terminal device activates the SCell by using the demodulated MAC CE signaling.

Step 102: activating a downlink SP RS based on the MAC CE signaling.

It should be noted that, in some embodiments of the present disclosure, the MAC CE signaling is not only used for the terminal device to activate an SCell, but also used for the network device to activate a downlink SP RS. That is, the MAC CE signaling may be reused to activate an SCell and activate a downlink SP RS.

Specifically, the downlink SP RS is configured by the network-side device and may be a semi-persistent tracking reference signal (Semi-Persistent Tracking Reference Signal, SP TRS), and/or a semi-persistent channel status indicate reference signal (Semi-Persistent Channel Status Indicate Reference Signal, SP CSI-RS), namely, at least one of an SP TRS and an SP CSI-RS.

Step 103: sending the downlink SP RS to the terminal device according to a transmission time of the downlink SP RS.

The transmission time of the downlink SP RS is dynamically determined, and is not periodic. The downlink SP RS is used by the terminal device to activate an SCell. When the downlink SP RS is an SP TRS, the terminal device may perform time-frequency tracking on a downlink channel of the SCell by using the SP TRS, i.e., after the terminal device receives an SP TRS on the SCell, the terminal device may calculate a frequency offset between its own and a center frequency point of a current SCell, as well as a time offset between its own and a clock of the current SCell according to a related algorithm, and compensate for the frequency offset and the time offset, to complete the time-frequency tracking of the SCell and complete activation of the SCell. When the downlink SP RS is an SP CSI-RS, the terminal device may measure downlink channel status information of the SCell by using the SP CSI-RS, and send the measured channel status information to the network-side device via uplink, so that the network-side device may perform resource allocation and scheduling on a downlink channel, such as a physical downlink shared channel (Physical Downlink Shared Channel, PDSCH), based on the acquired channel status information to complete activation of the SCell.

In the cell processing method in some embodiments of the present disclosure, MAC CE signaling is sent to a terminal device, wherein the MAC CE signaling is used to activate an SCell and a downlink SP RS, the downlink SP RS is sent to the terminal device according to a transmission time of the downlink SP RS, so that the terminal device activates an SCell by using the downlink SP RS to complete activation of the SCell. The transmission time of the downlink SP RS is dynamically determined, and is not periodic; thus, by activating the downlink SP RS with help of the MAC CE signaling and reasonably setting the transmission time of the downlink SP RS, the terminal device may acquire the downlink SP RS in time after the terminal device demodulates the MAC CE signaling. Therefore, an increase in activation time of the SCell is avoided, and a resource utilization rate is improved.

In some embodiments of the present disclosure, the transmission time of the downlink SP RS may be directly indicated, and the transmission time of the downlink SP RS may be one of:

a transmission time indicated by the MAC CE signaling or higher-layer signaling;

a transmission time indicated by the MAC CE signaling, wherein the transmission time is one of multiple transmission times indicated by higher-layer signaling;

a transmission time corresponding to a transmission time index value indicated by the MAC CE signaling, wherein the transmission time index value is one of multiple transmission time index values indicated by higher-layer signaling; and a transmission time predetermined in a protocol.

A person skilled in the art may understand that the foregoing MAC CE signaling indicating the transmission time may be a same MAC CE used to activate the downlink SP RS and the SCell, or another MAC CE independent of each other.

For example, the network device may determine a transmission time indicated by the MAC CE signaling or the higher-level signaling as the transmission time of the downlink SP RS; optionally, the network device may select a transmission time from multiple transmission times indicated by the higher-level signaling as the transmission time of the downlink SP RS according to the MAC CE signaling; optionally, according to the MAC CE signaling, the network device may select a transmission time index value from multiple transmission time index values indicated by the higher-level signaling, and determine a transmission time corresponding to the transmission time index value as the transmission time of the downlink SP RS; optionally, the network device may determine a transmission time predetermined in a protocol as the transmission time of the downlink SP RS.

It should be noted that, when the transmission time of the downlink SP RS is indicated or predetermined, the transmission time of the downlink SP RS should be slightly larger than a certain predetermined value to ensure that the terminal device receives the downlink SP RS in time after the terminal demodulates the MAC CE signaling. The predetermined value may be configured by the network-side device, reported by the terminal device, or predetermined in a protocol, etc., which is not limited in some embodiments of the present disclosure.

Figure 2:
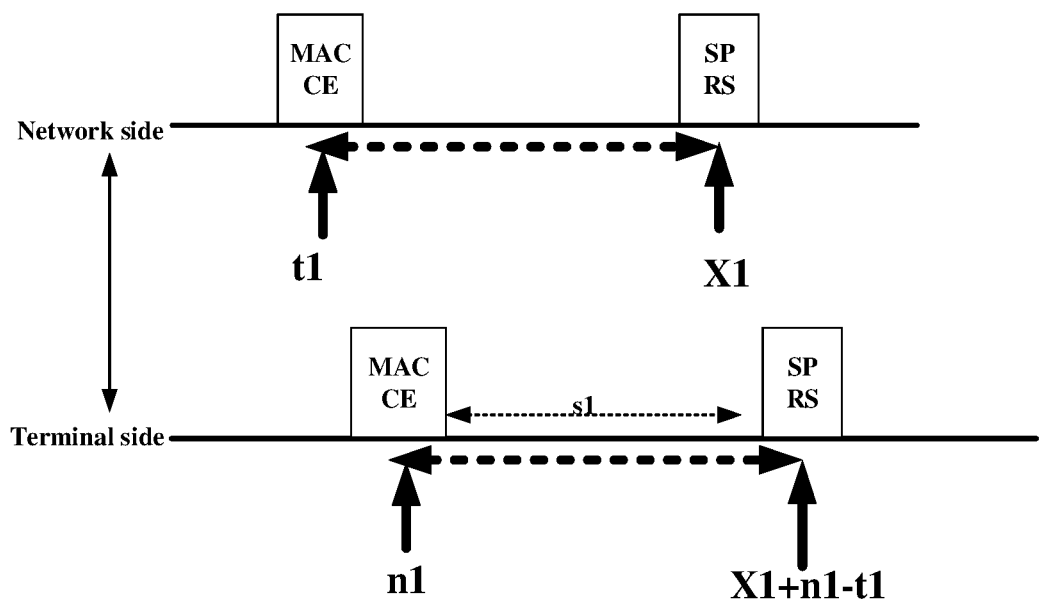
FIG. 2 is a schematic diagram illustrating an indication of a transmission time of a downlink SP RS according to the present disclosure.

For example, referring to FIG. 2, if the network device sends MAC CE signaling at time t1, the terminal device receives the MAC CE signaling at time n1, sending time of a downlink SP RS indicated by the MAC CE signaling is X1, demodulation time of the MAC CE signaling is s1, then time when the terminal device receives the downlink SP RS is X1+n1−t1; in order to ensure that the terminal device receives the downlink SP RS in time after the terminal device demodulates the MAC CE signaling, an offset value X1−t1 of reception time of the downlink SP RS relative to reception time of the MAC CE signaling should be slightly larger than the demodulation time s1 of the MAC CE signaling, that is, the sending time X1 of the downlink SP RS is slightly larger than t1+s1 (i.e., a sum of the sending time of the MAC CE signaling and the demodulation time of the MAC CE signaling).

In some embodiments of the present disclosure, the transmission time of the downlink SP RS may be related to a transmission time of the MAC CE signaling and a transmission-time offset value of the downlink SP RS, and the transmission-time offset value of the downlink SP RS is an offset value of the transmission time of the downlink SP RS relative to the transmission time of the MAC CE signaling.

Specifically, the transmission-time offset value of the downlink SP RS may be one of:

a time offset value indicated by the MAC CE signaling or higher-layer signaling;

a time offset value indicated by the MAC CE signaling, wherein the time offset value is one of multiple time offset values indicated by higher-layer signaling;

a time offset value corresponding to a time offset index value indicated by the MAC CE signaling, wherein the time offset index value is one of multiple time offset index values indicated by higher-layer signaling; and a time offset value predetermined in a protocol.

A person skilled in the art may understand that, the foregoing MAC CE signaling indicating the time offset value may be a same MAC CE used to activate the downlink SP RS and the SCell, or another MAC CE independent of each other.

For example, the network device may determine a time offset value indicated by the MAC CE signaling or the higher-level signaling as the transmission-time offset value of the downlink SP RS; optionally, the network device may select a time offset value from multiple time offset values indicated by the higher-level signaling as the transmission-time offset value of the downlink SP RS according to the MAC CE signaling; optionally, according to the MAC CE signaling, the network device may select a time offset index value from multiple time offset index values indicated by the higher-level signaling, and determine a time offset value corresponding to the time offset index value as the transmission-time offset value of the downlink SP RS; optionally, the network device may determine a time offset value predetermined in a protocol as the transmission-time offset value of the downlink SP RS.

It should be noted, the higher-layer signaling may be RRC signaling. When the time offset value is indicated or predetermined, the time offset value should be slightly larger than a certain predetermined value to ensure that the terminal device receives the downlink SP RS in time after the terminal device demodulates the MAC CE signaling. The predetermined value may be configured by the network-side device, reported by the terminal device, or predetermined in a protocol, etc., which is not limited in some embodiments of the present disclosure.

Figure 3:
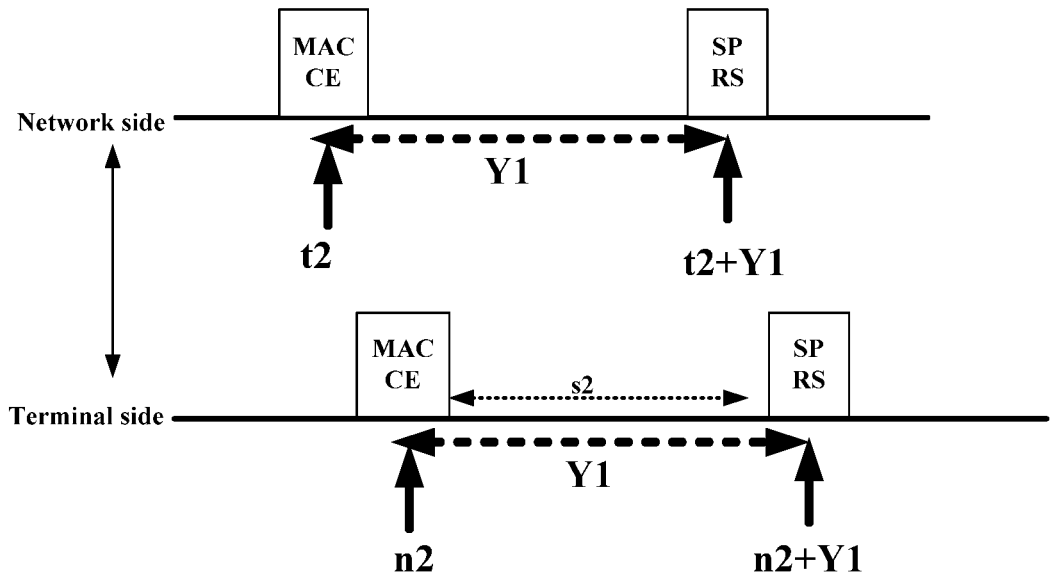
FIG. 3 is a schematic diagram illustrating an indication of a transmission-time offset value of a downlink SP RS according to the present disclosure.

For example, referring to FIG. 3, if the network device sends MAC CE signaling at time t2, the terminal device receives the MAC CE signaling at time n2, a transmission-time offset value of a downlink SP RS indicated by the MAC CE signaling is Y1, demodulation time of the MAC CE signaling is s2, then time when the terminal device receives the downlink SP RS is n2+Y1; in order to ensure that the terminal device receives the downlink SP RS in time after the terminal device demodulates the MAC CE signaling, the transmission-time offset value Y1 (i.e., a reception-time offset value) should be slightly larger than the demodulation time s2 of the MAC CE signaling.

In some embodiments of the present disclosure, prior to Step 103, the method further includes:

determining a downlink bandwidth part (Bandwidth Part, BWP) to which the downlink SP RS belongs; wherein the BWP may be a first BWP activated for the secondary cell, or a default BWP.

Correspondingly, Step 103 may include:

sending the downlink SP RS to the terminal device on the downlink BWP according to a transmission time of the downlink SP RS.

Further, subsequent to determining the downlink BWP, the method further includes:

sending indication information used to indicate the downlink BWP to the terminal device, so that the terminal device receives the downlink SP RS on the corresponding downlink BWP.

Figure 4:
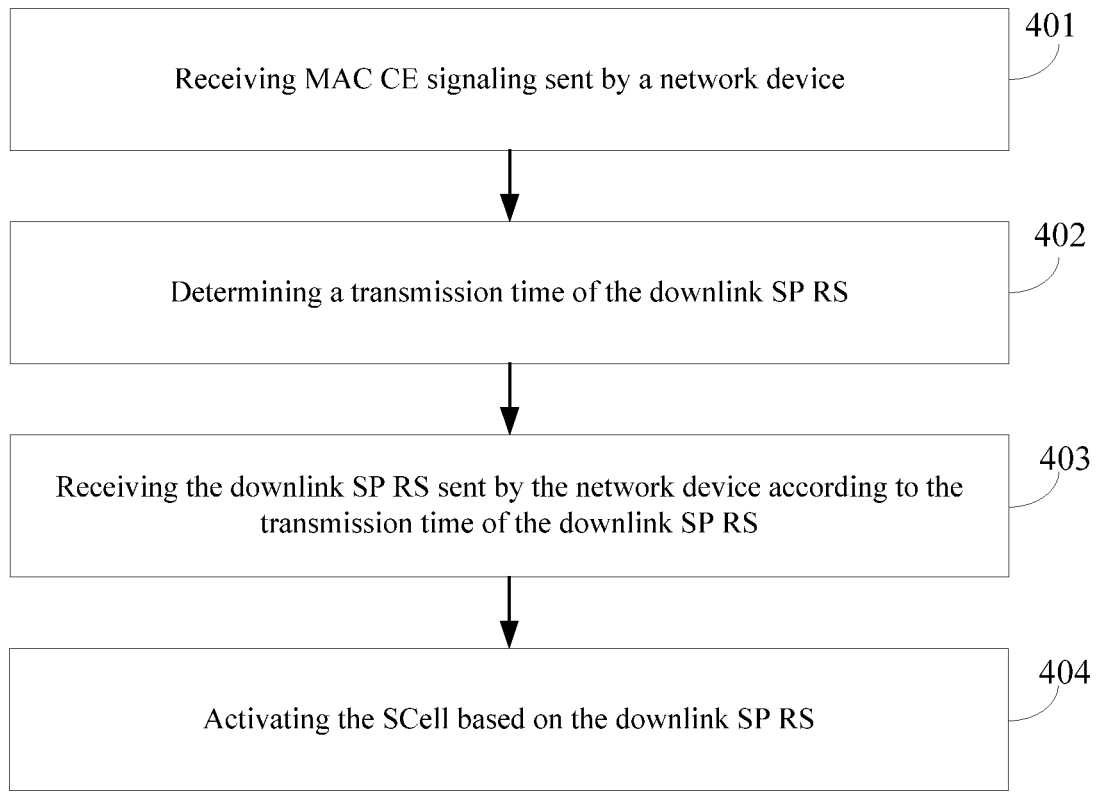
FIG. 4 is another flowchart of a cell processing method according to some embodiments of the present disclosure.

Referring to FIG. 4, some embodiments of the present disclosure further provide a cell processing method, and the method is applied to a terminal device and includes the following steps.

Step 401: receiving media access control layer control element (Media Access Control layer Control Element, MAC CE) signaling sent by a network device, wherein the MAC CE signaling is used to activate a Secondary Cell (SCell) and a downlink semi-persistent reference signal (Semi-Persistent Reference Signal, SP RS).

Step 402: determining a transmission time of the downlink SP RS.

Step 403: receiving the downlink SP RS according to the transmission time of the downlink SP RS, the downlink SP RS being sent by the network device.

Step 404: activating the SCell based on the downlink SP RS.

In the cell processing method in some embodiments of the present disclosure, MAC CE signaling sent by a network device is received, wherein the MAC CE signaling is used to activate an SCell and a downlink SP RS, and a transmission time of the downlink SP RS is determined, the downlink SP RS sent by the network device is received according to the transmission time of the downlink SP RS, the SCell is activated based on the downlink SP RS, to complete activation of the SCell. The transmission time of the downlink SP RS is dynamically set; thus, by reasonably determining the transmission time of the downlink SP RS, the terminal device may acquire the downlink SP RS in time after the terminal device demodulates the MAC CE signaling. Therefore, an increase in activation time of the SCell is avoided, and a resource utilization rate is improved.

In some embodiments of the present disclosure, optionally, the downlink SP RS is at least one of an SP TRS and an SP CSI-RS.

Optionally, the transmission time of the downlink SP RS is related to a transmission time of the MAC CE signaling and a transmission-time offset value of the downlink SP RS, and the transmission-time offset value of the downlink SP RS is an offset value of the transmission time of the downlink SP RS relative to the transmission time of the MAC CE signaling.

Optionally, the transmission time of the downlink SP RS is one of:

a transmission time indicated by the MAC CE signaling or higher-layer signaling;

a transmission time indicated by the MAC CE signaling, wherein the transmission time is one of multiple transmission times indicated by higher-layer signaling;

a transmission time corresponding to a transmission time index value indicated by the MAC CE signaling, wherein the transmission time index value is one of multiple transmission time index values indicated by higher-layer signaling; and a transmission time predetermined in a protocol.

Optionally, the transmission-time offset value of the downlink SP RS is one of:

a time offset value indicated by the MAC CE signaling or higher-layer signaling;

a time offset value indicated by the MAC CE signaling, wherein the time offset value is one of multiple time offset values indicated by higher-layer signaling;

a time offset value corresponding to a time offset index value indicated by the MAC CE signaling, wherein the time offset index value is one of multiple time offset index values indicated by higher-layer signaling; and a time offset value predetermined in a protocol.

Optionally, the high-level signaling may be RRC signaling.

In some embodiments of the present disclosure, prior to Step 403, the method further includes:

receiving indication information sent by the network device, wherein the indication information is used to indicate a BWP to which the downlink SP RS belongs, and the downlink BWP may be a first BWP activated for the secondary cell, or a default BWP.

Correspondingly, Step 403 may include:

receiving the downlink SP RS, which is sent by the network device, on the downlink BWP according to the transmission time of the downlink SP RS.

Figure 5:
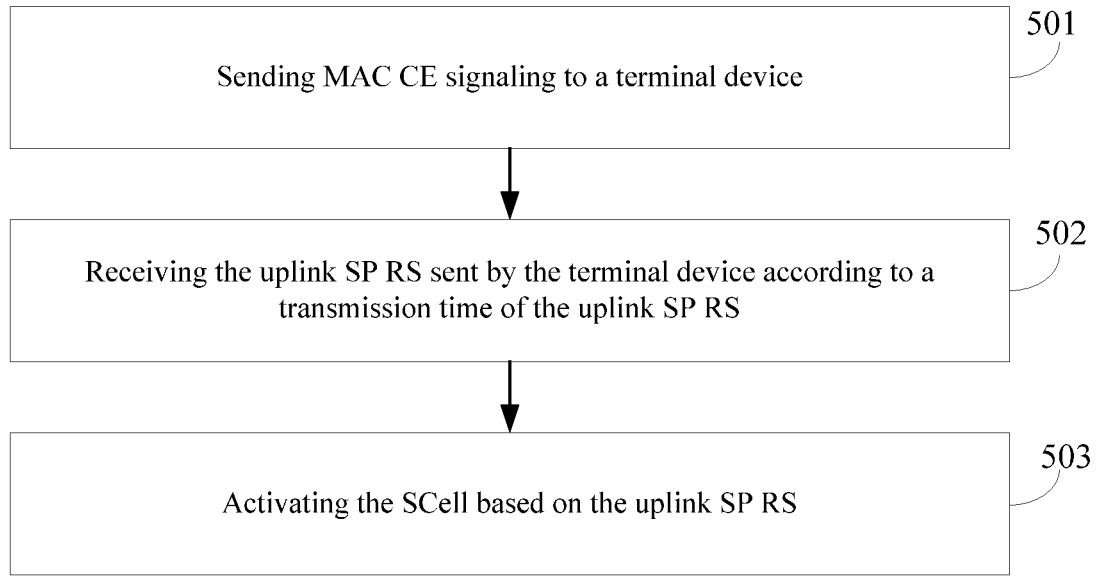
FIG. 5 is still another flowchart of a cell processing method according to some embodiments of the present disclosure.

Referring to FIG. 5, some embodiments of the present disclosure further provide a cell processing method, and the method is applied to a network device and includes the following steps.

Step 501: sending MAC CE signaling to a terminal device.

The MAC CE signaling is used to activate an SCell and an SP RS. After the terminal device receives the MAC CE signaling, the terminal device may first demodulate the MAC CE signaling, and send reception feedback to the network-side device; then, after the terminal device demodulates the MAC CE signaling, the terminal device activates the SCell by using the demodulated MAC CE signaling; and the terminal activates the uplink SP RS based on the MAC CE signaling.

Step 502: receiving the uplink SP RS according to a transmission time of the uplink SP RS, the uplink SP RS being sent by the terminal device.

The transmission time of the downlink SP RS is dynamically determined, and is not periodic. The uplink SP RS is configured by the network-side device, and may be a semi-persistent sounding reference signal (Semi-Persistent Sounding Reference Signal, SP SRS).

Step 503: activating the SCell based on the uplink SP RS.

Specifically, when the uplink SP RS is an SP SRS, the network device may measure uplink channel status information of the SCell by using the SP SRS, and performs resource allocation and scheduling on an uplink channel, such as a physical uplink shared channel (Physical Uplink Shared Channel, PUSCH), by using the measured channel status information to complete activation of the SCell.

In the cell processing method in some embodiments of the present disclosure, MAC CE signaling is sent to a terminal device, wherein the MAC CE signaling is used to activate an SCell and an uplink SP RS, the uplink SP RS sent by the terminal device is received according to the transmission time of the uplink SP RS, the SCell is activated based on the uplink SP RS. The transmission time of the uplink SP RS is dynamically set; thus, with the help of reasonable determination of the transmission time of the uplink SP RS, the network device may acquire the uplink SP RS in time after the MAC CE signaling is demodulated. Therefore, an increase in activation time of the SCell is avoided, and a resource utilization rate is improved.

In some embodiments of the present disclosure, the transmission time of the uplink SP RS may be directly indicated, and the transmission time of the uplink SP RS may be one of:

a transmission time indicated by the MAC CE signaling or higher-layer signaling;

a transmission time indicated by the MAC CE signaling, wherein the transmission time is one of multiple transmission times indicated by higher-layer signaling;

a transmission time corresponding to a transmission time index value indicated by the MAC CE signaling, wherein the transmission time index value is one of multiple transmission time index values indicated by higher-layer signaling; and a transmission time predetermined in a protocol.

A person skilled in the art may understand that the foregoing MAC CE signaling indicating the transmission time may be a same MAC CE used to activate the downlink SP RS and the SCell, or another MAC CE independent of each other.

It should be noted that, when the transmission time of the uplink SP RS is indicated or predetermined, the transmission time of the uplink SP RS should be slightly larger than a certain predetermined value to ensure that the network device receives the uplink SP RS in time after the MAC CE signaling is demodulated. The predetermined value may be configured by the network-side device, reported by the terminal device, or predetermined in a protocol, etc., which is not limited in some embodiments of the present disclosure.

Figure 6:
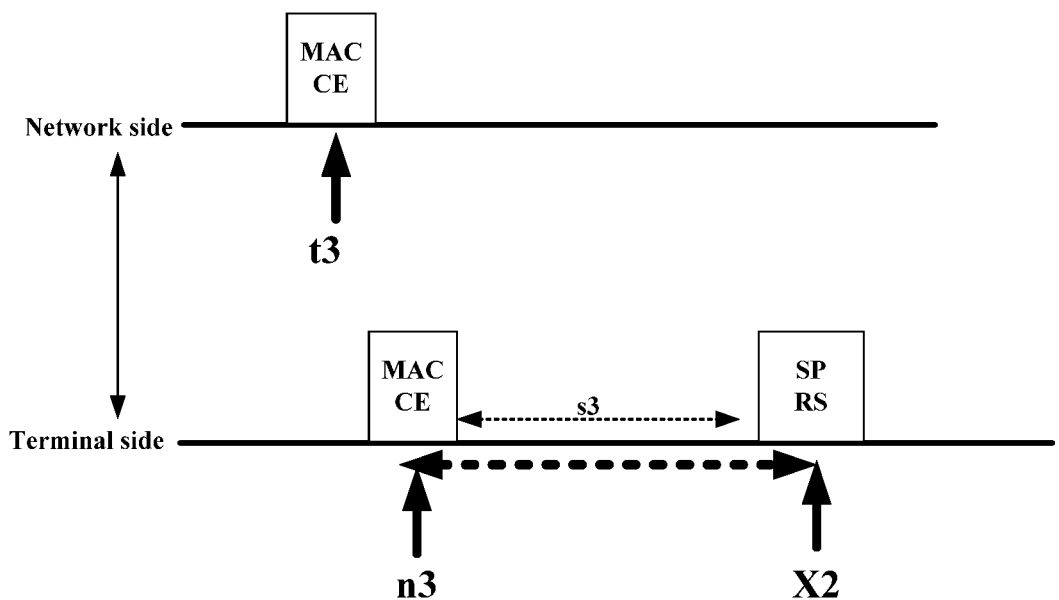
FIG. 6 is a schematic diagram illustrating an indication of a transmission time of an uplink SP RS according to the present disclosure.

For example, referring to FIG. 6, if the network device sends MAC CE signaling at time t3, the terminal device receives the MAC CE signaling at time n3, sending time of an uplink SP RS indicated by the MAC CE signaling is X2, demodulation time of the MAC CE signaling is s3, then time when the terminal device sends the uplink SP RS is X2; in order to ensure that the network device acquires the uplink SP RS in time after the MAC CE signaling is demodulated, a difference value of the sending time X2 of the uplink SP RS relative to the reception time n3 of the MAC CE signaling should be slightly larger than the demodulation time s3 of the MAC CE signaling, that is, the sending time X2 of the uplink SP RS is slightly larger than n3+s3 (i.e., a sum of the reception time of the MAC CE signaling and the demodulation time of the MAC CE signaling).

In some embodiments of the present disclosure, the transmission time of the uplink SP RS may be related to a transmission time of the MAC CE signaling and a transmission-time offset value of the uplink SP RS, and the transmission-time offset value of the uplink SP RS is an offset value of the transmission time of the uplink SP RS relative to the transmission time of the MAC CE signaling.

Specifically, the transmission time of the uplink SP RS is one of:

a transmission time indicated by the MAC CE signaling or higher-layer signaling;

a transmission time indicated by the MAC CE signaling, wherein the transmission time is one of multiple transmission times indicated by higher-layer signaling;

a transmission time corresponding to a transmission time index value indicated by the MAC CE signaling, wherein the transmission time index value is one of multiple transmission time index values indicated by higher-layer signaling; and a transmission time predetermined in a protocol.

A person skilled in the art may understand that the foregoing MAC CE signaling indicating the time offset value may be a same MAC CE used to activate the downlink SP RS and the SCell, or another MAC CE independent of each other.

It should be noted that, the high-level signaling may be RRC signaling. When the time offset value is indicated or predetermined, the time offset value should be slightly larger than a certain predetermined value to ensure that the network device receives the uplink SP RS in time after the MAC CE signaling is demodulated. The predetermined value may be configured by the network-side device, reported by the terminal device, or predetermined in a protocol, etc., which is not limited in some embodiments of the present disclosure.

Figure 7:
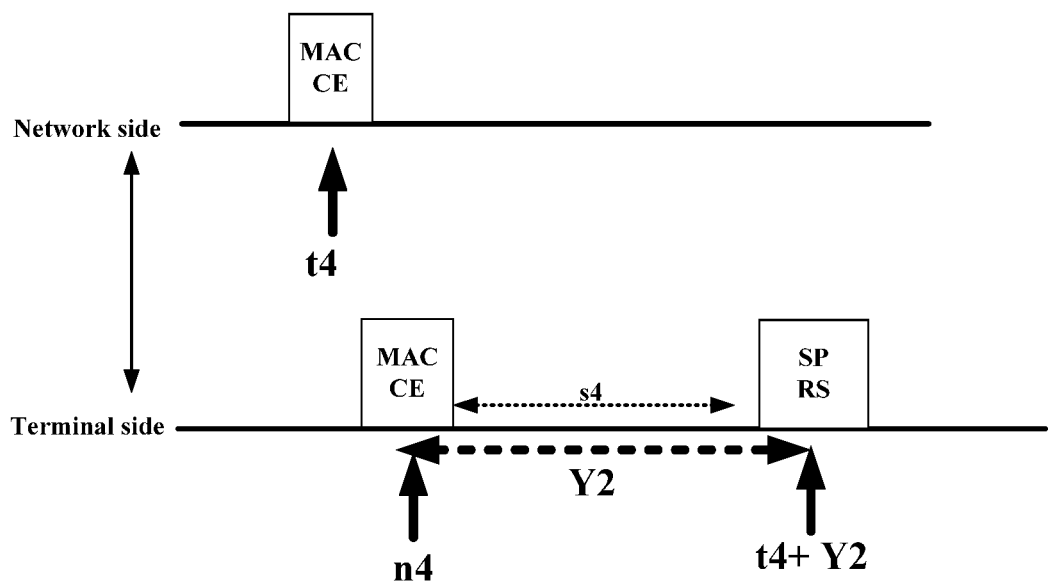
FIG. 7 is a schematic diagram illustrating an indication of a transmission-time offset value of an uplink SP RS according to the present disclosure.

For example, referring to FIG. 7, if the network device sends MAC CE signaling at time t4, the terminal device receives the MAC CE signaling at time n4, sending-time offset value of an uplink SP RS indicated by the MAC CE signaling is Y2, demodulation time of the MAC CE signaling is s4, then time when the terminal device sends the uplink SP RS is t4+Y2; in order to ensure that the network device acquires the uplink SP RS in time after the MAC CE signaling is demodulated, the sending time t4+Y2 of the uplink SP RS relative to the reception time n4 of the MAC CE signaling should be slightly larger than the demodulation time s3 of the MAC CE signaling, that is, the sending-time offset value Y2 of the uplink SP RS is slightly larger than s3+n4−t4 (i.e., a sum of the demodulation time of the MAC CE signaling and delay time for sending and receiving signaling).

In some embodiments of the present disclosure, prior to Step 502, the method further includes:

receiving indication information sent by the terminal device, wherein the indication information is used to indicate an uplink BWP to which the uplink SP RS belongs, and the uplink BWP may be a first BWP activated for the secondary cell, or a default BWP.

Correspondingly, Step 502 may include:

receiving the uplink SP RS, which is sent by the terminal device, on the uplink BWP according to the transmission time of the uplink SP RS.

Figure 8:
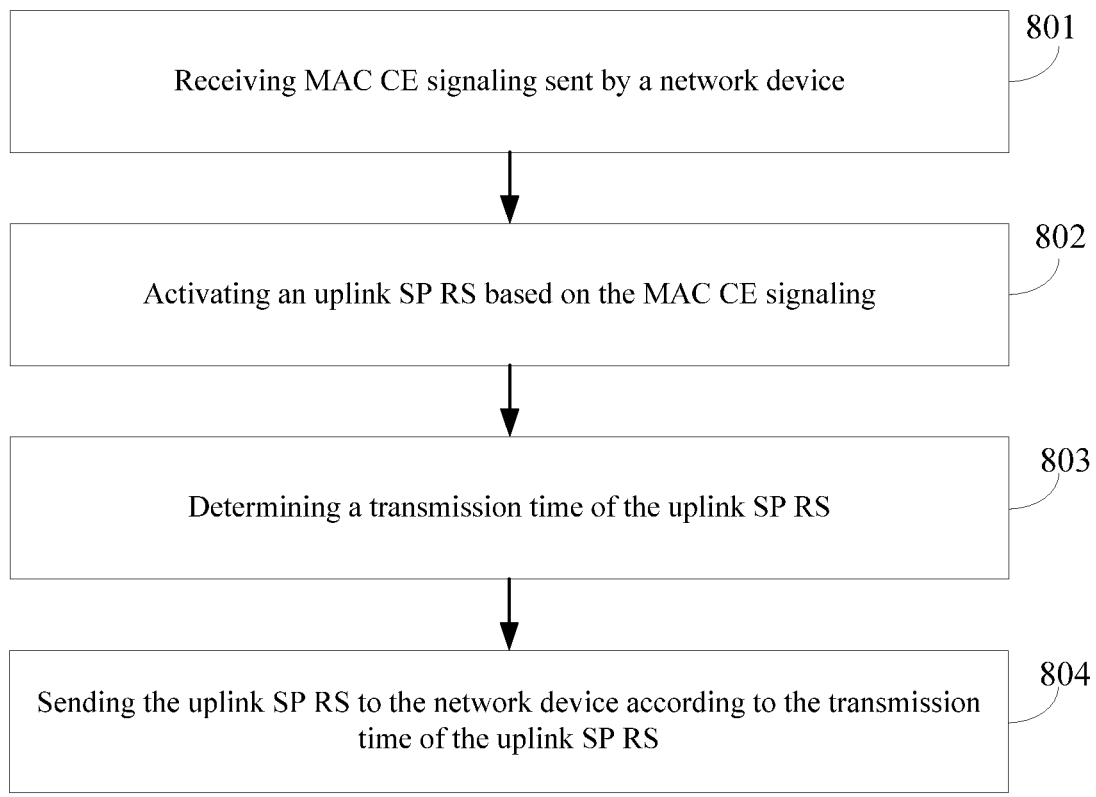
FIG. 8 is a further flowchart of a cell processing method according to some embodiments of the present disclosure.

Referring to FIG. 8, some embodiments of the present disclosure further provide a cell processing method, and the method is applied to a terminal device and includes the following steps.

Step 801: receiving MAC CE signaling sent by a network device, wherein the MAC CE signaling is used to activate an SCell.

Step 802: activating an uplink SP RS based on the MAC CE signaling.

Step 803: determining a transmission time of the uplink SP RS.

Step 804: sending the uplink SP RS to the network device according to the transmission time of the uplink SP RS.

The uplink SP RS is used by the network device to activate the SCell.

In the cell processing method in some embodiments of the present disclosure, MAC CE signaling sent by a network device is received, wherein the MAC CE signaling is used to activate an SCell and an uplink SP RS, the uplink SP RS is sent to the network device according to the transmission time of the uplink SP RS, so that the network device activates the SCell by using the uplink SP RS, to complete activation of the SCell. The transmission time of the uplink SP RS is dynamically set; thus, by reasonably setting the transmission time of the uplink SP RS, the network device may acquire the uplink SP RS in time after the MAC CE signaling is demodulated. Therefore, an increase in activation time of the SCell is avoided, and a resource utilization rate is improved.

In some embodiments of the present disclosure, optionally, the uplink SP RS is an SP SRS.

Optionally, the transmission time of the uplink SP RS is related to a transmission time of the MAC CE signaling and a transmission-time offset value of the uplink SP RS, and the transmission-time offset value of the uplink SP RS is an offset value of the transmission time of the uplink SP RS relative to the transmission time of the MAC CE signaling.

Optionally, the transmission time of the uplink SP RS is one of:

a transmission time indicated by the MAC CE signaling or higher-layer signaling;

a transmission time indicated by the MAC CE signaling, wherein the transmission time is one of multiple transmission times indicated by higher-layer signaling;

a transmission time corresponding to a transmission time index value indicated by the MAC CE signaling, wherein the transmission time index value is one of multiple transmission time index values indicated by higher-layer signaling; and a transmission time predetermined in a protocol.

Optionally, the transmission-time offset value of the uplink SP RS is one of:

a time offset value indicated by the MAC CE signaling or higher-layer signaling;

a time offset value indicated by the MAC CE signaling, wherein the time offset value is one of multiple time offset values indicated by higher-layer signaling;

a time offset value corresponding to a time offset index value indicated by the MAC CE signaling, wherein the time offset index value is one of multiple time offset index values indicated by higher-layer signaling; and a time offset value predetermined in a protocol.

In some embodiments of the present disclosure, prior to Step 804, the method further includes:

determining an uplink BWP to which the uplink SP RS belongs; wherein the BWP may be a first BWP activated for the secondary cell, or a default BWP.

Correspondingly, Step 804 may include:

sending the uplink SP RS to the network device on the uplink BWP according to the transmission time of the uplink SP RS.

Further, subsequent to determining the uplink BWP, the method further includes:

sending to the network device indication information used to indicate the uplink BWP, so that the network device receives the uplink SP RS on the corresponding uplink BWP.

The cell processing method of the present disclosure is described in the foregoing embodiments, and a network device and a terminal device of the cell processing method of the present disclosure will be described below with reference to the embodiments and drawings.

Figure 9:
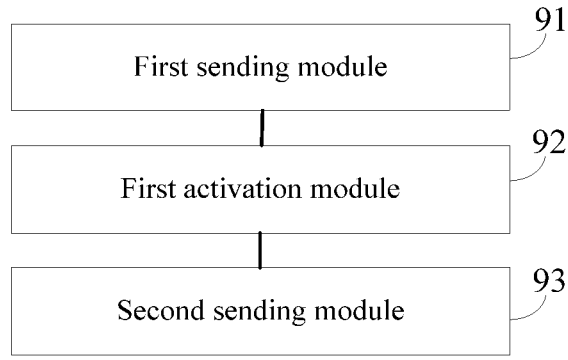
FIG. 9 is a first schematic structural diagram of a network device according to some embodiments of the present disclosure.

Referring to FIG. 9, some embodiments of the present disclosure further provide a network device, and the network device includes:

a first sending module 91, configured to send MAC CE signaling to a terminal device, wherein the MAC CE signaling is used to activate an SCell;

a first activation module 92, configured to activate a downlink Semi-persistent Reference signal (SP RS) based on the MAC CE signaling; and a second sending module 93, configured to send the downlink SP RS to the terminal device according to a transmission time of the downlink SP RS, wherein the downlink SP RS is used by the terminal device to activate the SCell.

The network device in some embodiments of the present disclosure sends MAC CE signaling to a terminal device, wherein the MAC CE signaling is used to activate an SCell and a downlink SP RS; the network device sends the downlink SP RS to the terminal device according to a transmission time of the downlink SP RS, so that the terminal device activates an SCell by using the downlink SP RS to complete activation of the SCell. The transmission time of the downlink SP RS is dynamically set, and is not periodic; thus, by activating the downlink SP RS with help of the MAC CE signaling and reasonably setting the transmission time of the downlink SP RS, the terminal device may acquire the downlink SP RS in time after the terminal device demodulates the MAC CE signaling. Therefore, an increase in activation time of the SCell is avoided, and a resource utilization rate is improved.

In some embodiments of the present disclosure, optionally, the downlink SP RS is an SP TRS and/or an SP CSI-RS.

Optionally, the transmission time of the downlink SP RS is related to a transmission time of the MAC CE signaling and a transmission-time offset value of the downlink SP RS, and the transmission-time offset value of the downlink SP RS is an offset value of the transmission time of the downlink SP RS relative to the transmission time of the MAC CE signaling.

Optionally, the transmission time of the downlink SP RS is one of:

a transmission time indicated by the MAC CE signaling or higher-layer signaling;

a transmission time indicated by the MAC CE signaling, wherein the transmission time is one of multiple transmission times indicated by higher-layer signaling;

a transmission time corresponding to a transmission time index value indicated by the MAC CE signaling, wherein the transmission time index value is one of multiple transmission time index values indicated by higher-layer signaling; and a transmission time predetermined in a protocol.

Optionally, the transmission-time offset value of the downlink SP RS is one of:

a time offset value indicated by the MAC CE signaling or higher-layer signaling;

a time offset value indicated by the MAC CE signaling, wherein the time offset value is one of multiple time offset values indicated by higher-layer signaling;

a time offset value corresponding to a time offset index value indicated by the MAC CE signaling, wherein the time offset index value is one of multiple time offset index values indicated by higher-layer signaling; and a time offset value predetermined in a protocol.

Optionally, the high-level signaling may be RRC signaling.

Optionally, the network device further includes:

a third determination module, configured to determine a downlink Bandwidth Part (BWP) to which the downlink SP RS belongs.

The second sending module 93 is specifically configured to:

send the downlink SP RS to the terminal device on the downlink BWP.

Optionally, the network device further includes:

a fifth sending module, configured to send indication information used to indicate the downlink BWP to the terminal device.

Figure 10:
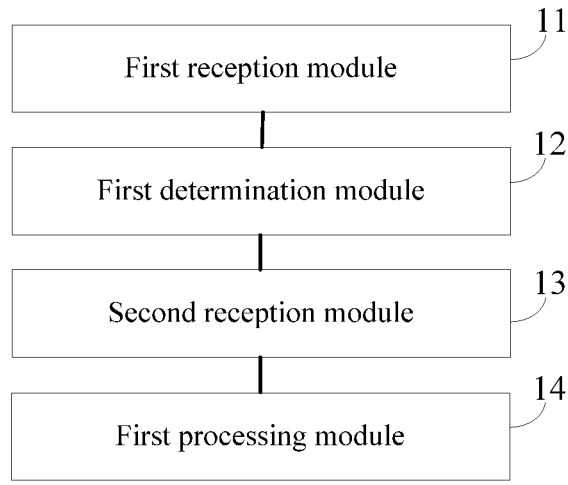
FIG. 10 is a first schematic structural diagram of a terminal device according to some embodiments of the present disclosure.

Referring to FIG. 10, some embodiments of the present disclosure further provide a terminal device, and the terminal device includes:

a first reception module 11, configured to receive media access control layer control element (Media Access Control layer Control Element, MAC CE) signaling sent by a network device, wherein the MAC CE signaling is used to activate a Secondary Cell (SCell) and a downlink semi-persistent reference signal (Semi-Persistent Reference Signal, SP RS);

a first determination module 12, configured to determine a transmission time of the downlink SP RS;

a second reception module 13, configured to receive the downlink SP RS according to the transmission time of the downlink SP RS, the downlink SP RS being sent by the network device; and a first processing module 14, configured to activate the SCell based on the downlink SP RS.

The terminal device in some embodiments of the present disclosure receives MAC CE signaling sent by a network device, wherein the MAC CE signaling is used to activate an SCell and a downlink SP RS, and the terminal device determines a transmission time of the downlink SP RS, receives the downlink SP RS sent by the network device according to the transmission time of the downlink SP RS, activates the SCell based on the downlink SP RS, to complete activation of the SCell. The transmission time of the downlink SP RS is dynamically set and is not periodic, thus, by reasonably setting the transmission time of the downlink SP RS, the terminal device may acquire the downlink SP RS in time after the MAC CE signaling is demodulated. Therefore, an increase in activation time of the SCell is avoided, and a resource utilization rate is improved.

In some embodiments of the present disclosure, optionally, the downlink SP RS is an SP TRS and/or an SP CSI-RS.

Optionally, the transmission time of the downlink SP RS is related to a transmission time of the MAC CE signaling and a transmission-time offset value of the downlink SP RS, and the transmission-time offset value of the downlink SP RS is an offset value of the transmission time of the downlink SP RS relative to the transmission time of the MAC CE signaling.

Optionally, the transmission time of the downlink SP RS is one of:

a transmission time indicated by the MAC CE signaling or higher-layer signaling;

a transmission time indicated by the MAC CE signaling, wherein the transmission time is one of multiple transmission times indicated by higher-layer signaling;

a transmission time corresponding to a transmission time index value indicated by the MAC CE signaling, wherein the transmission time index value is one of multiple transmission time index values indicated by higher-layer signaling; and a transmission time predetermined in a protocol.

Optionally, the transmission-time offset value of the downlink SP RS is one of:

a time offset value indicated by the MAC CE signaling or higher-layer signaling;

a time offset value indicated by the MAC CE signaling, wherein the time offset value is one of multiple time offset values indicated by higher-layer signaling;

a time offset value corresponding to a time offset index value indicated by the MAC CE signaling, wherein the time offset index value is one of multiple time offset index values indicated by higher-layer signaling; and a time offset value predetermined in a protocol.

Optionally, the high-level signaling may be RRC signaling.

Optionally, the terminal device further includes:

a fifth reception module, configured to receive indication information sent by the network device, wherein the indication information is used to indicate a downlink bandwidth part (Bandwidth Part, BWP) to which the downlink SP RS belongs.

The second reception module 13 is specifically configured to:

receive the downlink SP RS on the downlink BWP.

Figure 11:
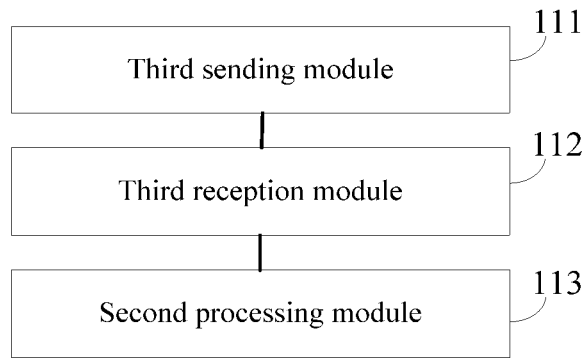
FIG. 11 is a second schematic structural diagram of a network device according to some embodiments of the present disclosure.

Referring to FIG. 11, some embodiments of the present disclosure further provide a network device, and the network device includes:

a third sending module 111, configured to send media access control layer control element (Media Access Control layer Control Element, MAC CE) signaling to a terminal device, wherein the MAC CE signaling is used to activate a Secondary Cell (SCell) and an uplink semi-persistent reference signal (Semi-Persistent Reference Signal, SP RS);

a third reception module 112, configured to receive the uplink SP RS according to a transmission time of the uplink SP RS, the uplink SP RS being sent by the terminal device; and a second processing module 113, configured to activate the SCell based on the uplink SP RS.

The network device in some embodiments of the present disclosure sends MAC CE signaling to a terminal device, wherein the MAC CE signaling is used to activate an SCell and an uplink SP RS; the network device receives the uplink SP RS sent by the terminal device according to the transmission time of the uplink SP RS, activates the SCell based on the uplink SP RS. The transmission time of the uplink SP RS is dynamically set and is not periodic; thus, with the help of reasonable set of the transmission time of the uplink SP RS, the network device may acquire the uplink SP RS in time after the MAC CE signaling is demodulated. Therefore, an increase in activation time of the SCell is avoided, and a resource utilization rate is improved.

In some embodiments of the present disclosure, optionally, the uplink SP RS is an SP SRS.

Optionally, the transmission time of the uplink SP RS is related to a transmission time of the MAC CE signaling and a transmission-time offset value of the uplink SP RS, and the transmission-time offset value of the uplink SP RS is an offset value of the transmission time of the uplink SP RS relative to the transmission time of the MAC CE signaling.

Optionally, the transmission time of the uplink SP RS is one of:

a transmission time indicated by the MAC CE signaling or higher-layer signaling;

a transmission time indicated by the MAC CE signaling, wherein the transmission time is one of multiple transmission times indicated by higher-layer signaling;

a transmission time corresponding to a transmission time index value indicated by the MAC CE signaling, wherein the transmission time index value is one of multiple transmission time index values indicated by higher-layer signaling; and a transmission time predetermined in a protocol.

Optionally, the transmission-time offset value of the uplink SP RS is one of:

a time offset value indicated by the MAC CE signaling or higher-layer signaling;

a time offset value indicated by the MAC CE signaling, wherein the time offset value is one of multiple time offset values indicated by higher-layer signaling;

a time offset value corresponding to a time offset index value indicated by the MAC CE signaling, wherein the time offset index value is one of multiple time offset index values indicated by higher-layer signaling; and a time offset value predetermined in a protocol.

Optionally, the network device further includes:

a sixth reception module, configured to receive indication information sent by the terminal device, wherein the indication information is used to indicate a uplink bandwidth part (Bandwidth Part, BWP) to which the uplink SP RS belongs.

The third reception module 112 is specifically configured to:

receive the uplink SP RS on the uplink BWP.

Figure 12:
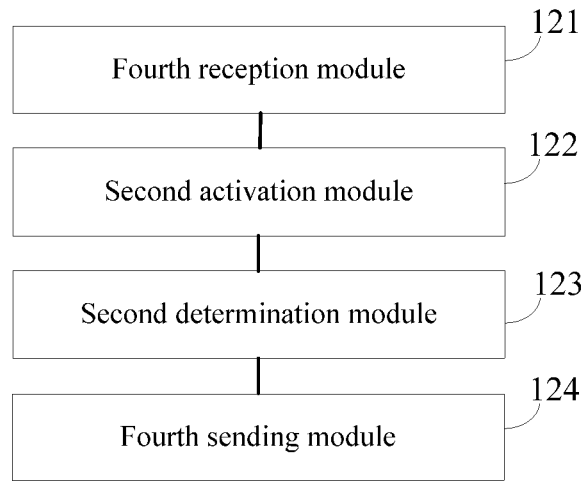
FIG. 12 is a second schematic structural diagram of a terminal device according to some embodiments of the present disclosure.

Referring to FIG. 12, some embodiments of the present disclosure further provide a terminal device, and the terminal device includes:

a fourth reception module 121, configured to receive media access control layer control element (Media Access Control layer Control Element, MAC CE) signaling sent by a network device, wherein the MAC CE signaling is used to activate a Secondary Cell (SCell);

a second activation module 122, configured to activate an uplink semi-persistent reference signal (Semi-Persistent Reference Signal, SP RS) based on the MAC CE signaling;

a second determination module 123, configured to determine a transmission time of the uplink SP RS; and a fourth sending module 124, configured to send the uplink SP RS to the network device according to the transmission time of the uplink SP RS, wherein the uplink SP RS is used by the network device to activate the SCell.

The terminal device in some embodiments of the present disclosure receives MAC CE signaling sent by a network device, wherein the MAC CE signaling is used to activate an SCell and an uplink SP RS; the terminal device sends the uplink SP RS to the network device according to the transmission time of the uplink SP RS, so that the network device activates the SCell by using the uplink SP RS, to complete activation of the SCell. The transmission time of the uplink SP RS is dynamically set and is not periodic; thus, by reasonably setting the transmission time of the uplink SP RS, the network device may acquire the uplink SP RS in time after the MAC CE signaling is demodulated. Therefore, an increase in activation time of the SCell is avoided, and a resource utilization rate is improved.

In some embodiments of the present disclosure, optionally, the uplink SP RS is an SP SRS.

Optionally, the transmission time of the uplink SP RS is related to a transmission time of the MAC CE signaling and a transmission-time offset value of the uplink SP RS, and the transmission-time offset value of the uplink SP RS is an offset value of the transmission time of the uplink SP RS relative to the transmission time of the MAC CE signaling.

Optionally, the transmission time of the uplink SP RS is one of:

a transmission time indicated by the MAC CE signaling or higher-layer signaling;

a transmission time indicated by the MAC CE signaling, wherein the transmission time is one of multiple transmission times indicated by higher-layer signaling;

a transmission time corresponding to a transmission time index value indicated by the MAC CE signaling, wherein the transmission time index value is one of multiple transmission time index values indicated by higher-layer signaling; and a transmission time predetermined in a protocol.

Optionally, the transmission-time offset value of the uplink SP RS is one of:

a time offset value indicated by the MAC CE signaling or higher-layer signaling;

a time offset value indicated by the MAC CE signaling, wherein the time offset value is one of multiple time offset values indicated by higher-layer signaling;

a time offset value corresponding to a time offset index value indicated by the MAC CE signaling, wherein the time offset index value is one of multiple time offset index values indicated by higher-layer signaling; and a time offset value predetermined in a protocol.

Optionally, the terminal device further includes:

a fourth determination module, configured to determine an uplink Bandwidth Part (BWP) to which the uplink SP RS belongs.

The fourth sending module 124 is specifically configured to:

send the uplink SP RS to the network device on the uplink BWP.

Optionally, the terminal device further includes:

a sixth sending module, configured to send to the network device indication information used to indicate the uplink BWP.

In addition, some embodiments of the present disclosure also provide a terminal device, the terminal device includes a processor, a storage, and a computer program stored on the storage and executed by the processor, wherein, when the computer program is executed by the processor, the processor implements various process in the foregoing cell processing method embodiments applied to a terminal device, and the same technical effect may be achieved, which will not be repeated herein to avoid repetition.

Figure 13:
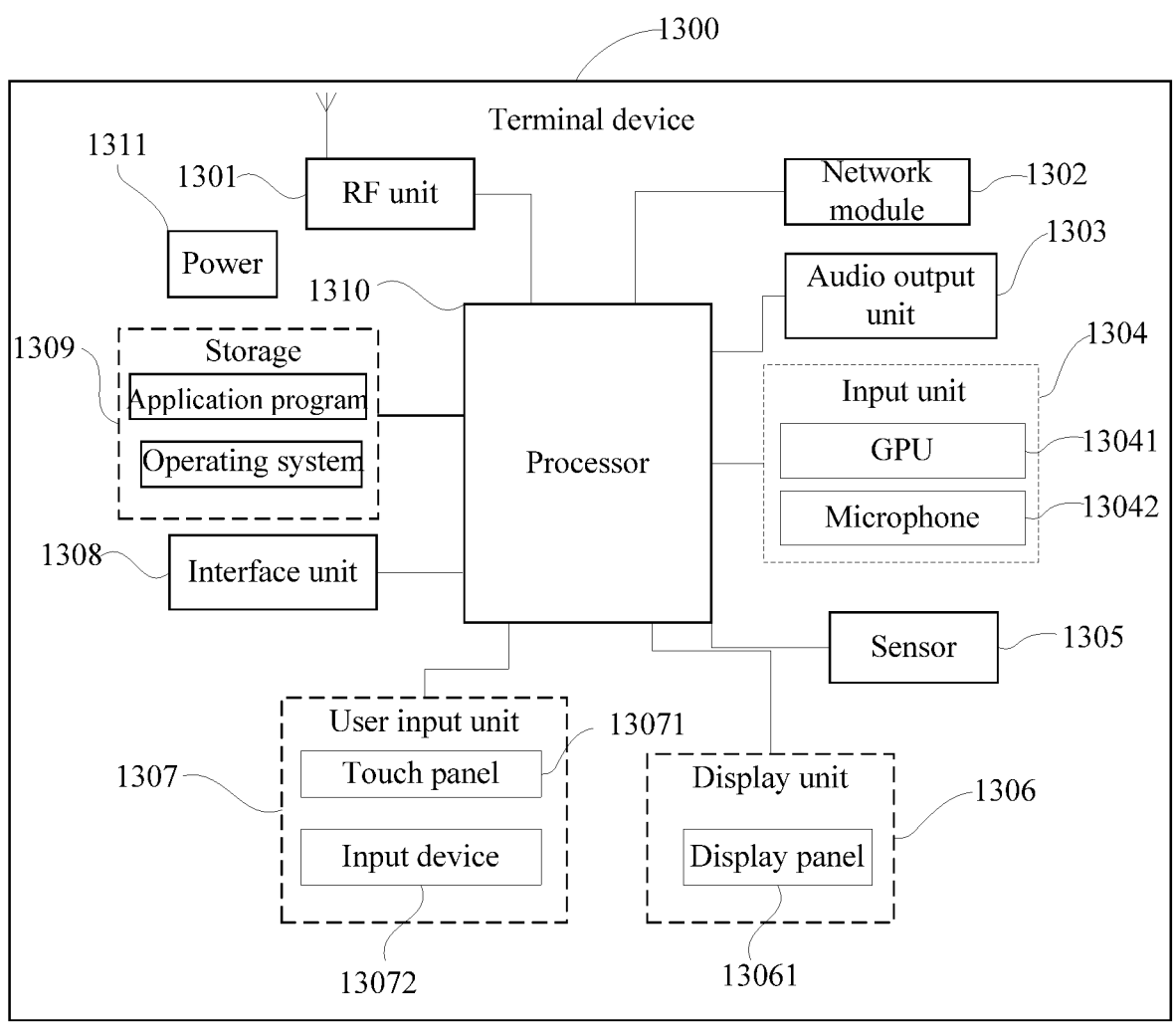
FIG. 13 is a third schematic structural diagram of a terminal device according to some embodiments of the present disclosure.

Specifically, FIG. 13 is a schematic diagram of a hardware structure of a terminal that implements various embodiments of the present disclosure. A terminal device 1300 includes, but is not limited to, a radio frequency unit 1301, a network module 1302, and an audio output unit 1303, an input unit 1304, a sensor 1305, a display unit 1306, a user input unit 1307, an interface unit 1308, a storage 1309, a processor 1310, and a power supply 1311 and other components. Those skilled in the art may understand that the structure of the terminal shown in FIG. 13 does not constitute a limitation on the terminal, and the terminal device may include more or fewer components than shown in the figure, or some combined components, or different arrangements of components. In some embodiments of the present disclosure, the terminal device includes, but is not limited to, a mobile phone, a tablet computer, a notebook computer, a palmtop computer, a car terminal, a wearable device, a pedometer, and the like.

The radio frequency unit 1301 is configured to: receive media access control layer control element (Media Access Control layer Control Element, MAC CE) signaling sent by a network device, wherein the MAC CE signaling is used to activate a Secondary Cell (SCell) and a downlink semi-persistent reference signal (Semi-Persistent Reference Signal, SP RS).

The processor 1310 is configured to: determine a transmission time of the downlink SP RS.

The radio frequency unit 1301 is further configured to: receive the downlink SP RS according to the transmission time of the downlink SP RS, the downlink SP RS being sent by the network device.

The processor 1310 is further configured to: activate the SCell based on the downlink SP RS.

The terminal device 1300 in some embodiments of the present disclosure receives MAC CE signaling sent by a network device, wherein the MAC CE signaling is used to activate an SCell and a downlink SP RS, and the terminal device 1300 determines a transmission time of the downlink SP RS, receives the downlink SP RS sent by the network device according to the transmission time of the downlink SP RS, and activates the SCell based on the downlink SP RS, to complete activation of the SCell. The transmission time of the downlink SP RS is dynamically set and is not periodic, thus, by reasonably setting the transmission time of the downlink SP RS, the terminal device may acquire the downlink SP RS in time after the MAC CE signaling is demodulated. Therefore, an increase in activation time of the SCell is avoided, and a resource utilization rate is improved.

Optionally, the radio frequency unit 1301 is configured to: receive media access control layer control element (Media Access Control layer Control Element, MAC CE) signaling sent by a network device, wherein the MAC CE signaling is used to activate a Secondary Cell (SCell).

The processor 1310 is configured to: activate an uplink SP RS based on the MAC CE signaling, and determine a transmission time of the uplink SP RS.

The radio frequency unit 1301 is configured to: send the uplink SP RS to the network device according to the transmission time of the uplink SP RS, wherein the uplink SP RS is used by the network device to activate the SCell.

The terminal device 1300 in some embodiments of the present disclosure receives MAC CE signaling sent by a network device, wherein the MAC CE signaling is used to activate an SCell and an uplink SP RS; the terminal device 1300 sends the uplink SP RS to the network device according to the transmission time of the uplink SP RS, so that the network device activates the SCell by using the uplink SP RS, to complete activation of the SCell. The transmission time of the uplink SP RS is dynamically set and is not periodic; thus, by reasonably setting the transmission time of the uplink SP RS, the network device may acquire the uplink SP RS in time after the MAC CE signaling is demodulated. Therefore, an increase in activation time of the SCell is avoided, and a resource utilization rate is improved.

It should be understood that, in some embodiments of the present disclosure, the radio frequency unit 1301 may be used to receive and send information or send and receive signals during a call. Specifically, downlink data from a base station is received and processed by the processor 1310; in addition, uplink data is sent to the base station. Generally, the radio frequency unit 1301 includes, but is not limited to, an antenna, at least one amplifier, a transceiver, a coupler, a low-noise amplifier, a duplexer, and the like. In addition, the radio frequency unit 1301 may also communicate with a network and other devices through a wireless communication system.

The terminal provides users with wireless broadband Internet access through the network module 1302, such as helping users to send and receive emails, to browse web pages, and to access streaming media, etc.

The audio output unit 1303 may convert audio data received by the radio frequency unit 1301 or the network module 1302 or stored in the storage 1309 into audio signals and output them as sound. Moreover, the audio output unit 1303 may also provide audio output (for example, call signal reception sound, message reception sound, etc.) related to a specific function performed by the terminal device 1300. The audio output unit 1303 includes a speaker, a buzzer, a receiver, and the like.

The input unit 1304 is used to receive audio signals or video signals. The input unit 1304 may include a graphics processing unit (Graphics Processing Unit, GPU) 13041 and a microphone 13042, and the graphics processing unit 13041 processes image data of a still picture or video obtained by an image capture device (such as a camera) in a video capture mode or an image capture mode. The processed image frames may be displayed on the display unit 1306. The image frames processed by the graphics processing unit 13041 may be stored in the storage 1309 (or other storage medium) or transmitted via the radio frequency unit 1301 or the network module 1302. The microphone 13042 may receive sound, and may process such sound into audio data. The processed audio data may be converted into an output format that may be transmitted to a mobile communication base station via the radio frequency unit 1301 in the case of a telephone call mode.

The terminal device 1300 further includes at least one sensor 1305, such as a light sensor, a motion sensor, and other sensors. Specifically, the light sensor includes an ambient light sensor and a proximity sensor, wherein the ambient light sensor may adjust brightness of a display panel 13061 according to brightness of the ambient light, and the proximity sensor may turn off the display panel 13061 and/or the backlight in a case that the terminal device 1300 is moved to the ear. As a type of motion sensor, an accelerometer sensor may detect a magnitude of acceleration in various directions (usually three axes), and detect a magnitude and direction of gravity in the case of stationary, and be used to identify attitude of the terminal (such as horizontal and vertical screen switching, related games, magnetometer attitude calibration), vibration recognition related functions (such as pedometer, tap), etc.; the sensor 1305 may also include a fingerprint sensor, a pressure sensor, an iris sensor, a molecular sensor, a gyroscope, a barometer, a hygrometer, a thermometer, an infrared sensor and the like, which are not repeated here.

The display unit 1306 may be configured to display information inputted by the user or information provided to the user. The display unit 1306 may include the display panel 13061, and the display panel 13061 may be configured as a form of a liquid crystal display (Liquid Crystal Display, LCD), an organic light-emitting diode (Organic Light-Emitting Diode, OLED) or the like.

The user input unit 1307 may be used to receive numeric information or character information input by a user and generate a signal input related to the user's settings and related to the function control of the terminal. Specifically, the user input unit 1307 includes a touch panel 13071 and other input devices 13072. The touch panel 13071, also referred to as a touch screen, may collect the user's touch operations thereon or nearby (such as the user's operation on the touch panel 13071 or near the touch panel 13071 using any suitable object or accessory such as a finger or a stylus). The touch panel 13071 may include two parts, namely a touch detection device and a touch controller. The touch detection device detects the touch orientation of the user, and detects a signal generated by the touch operation, and transmits the signal to the touch controller; the touch controller receives touch information from the touch detection device, converts the touch information into a coordinate of a touch point, transmits the coordinate to the processor 1310, and may receive and execute a command from the processor 1310. In addition, the touch panel 13071 can be implemented in various types such as resistive, capacitive, infrared, and surface acoustic waves, etc. In addition to the touch panel 13071, the user input unit 1307 may further include other input devices 13072. Specifically, the other input devices 13072 may include, but are not limited to, a physical keyboard, a function button (such as a volume control button, a switch button, etc.), a trackball, a mouse, and a joystick, and details thereof are not described herein again.

Further, the touch panel 13071 may cover the display panel 13061, in a case that the touch screen 13071 detects a touch operation thereon or nearby, the touch operation is transmitted to the processor 1310 to determine the type of the touch event, then the processor 1310 provides a corresponding visual output on the display screen 13061 based on the type of the touch event. Although in FIG. 13, the touch panel 13071 and the display panel 13061 are implemented as two independent components to implement input and output functions of the terminal, in some embodiments, the touch panel 13071 and the display panel 13061 may be integrated to implement the input and output functions of the terminal, which are not limited here.

The interface unit 1308 is an interface through which an external device is connected to the terminal device 1300. For example, the external device may include a wired or wireless headset port, an external power supply (or battery charger) port, a wired or wireless data port, a storage card port, a port for connecting a device with an identification module, and an audio input/output (Input/Output, I/O) port, a video I/O port, or a headphone port, etc. The interface unit 1308 may be used to receive input (e.g., data information, power, etc.) from the external device and transmit the received input to one or more elements within the terminal device 1300 or may be used to transmit data between the terminal device 1300 and the external device.

The storage 1309 may be used to store software programs and various data. The storage 1309 may mainly include a storage program area and a storage data area, wherein the storage program area may store an operating system, an application program (such as a sound playback function, an image playback function, etc.) required for at least one function, and the like; the storage data area may store data (such as audio data, a phone book, etc.) created based on the use of a mobile phone and the like. In addition, the storage 1309 may include a high-speed random access storage, and may further include a non-volatile storage, such as at least one magnetic disk storage device, a flash memory device, or other volatile solid-state storage device.

The processor 1310 is a control center of the terminal device, and uses various interfaces and lines to connect various parts of the entire terminal. By running or executing software programs and/or modules stored in the storage 1309 and calling data stored in the storage 1309, various functions of the terminal and processing data are performed, so that the overall monitoring of the terminal is performed. The processor 1310 may include one or more processing units; optionally, the processor 1310 may integrate an application processor and a modem processor, wherein the application processor mainly processes an operating system, a user interface, and an application program, etc. The modem processor mainly handles wireless communication. It could be understood that the modem processor may not be integrated into the processor 1310.

The terminal 1300 may further include a power source 1311 (such as a battery) for supplying power to various components. Optionally, the power supply 1311 may be logically connected to the processor 1310 through a power management system, so as to implement functions such as management of charging, management of discharging, and power consumption management through the power management system.

In addition, the terminal device 1300 includes some functional modules that are not shown, and details are not described herein again.

Some embodiments of the present disclosure also provide a network device, the network device includes a processor, a storage, and a computer program stored on the storage and executed by the processor, wherein, when the computer program is executed by the processor, the processor implements various process in the foregoing cell processing method embodiments applied to a network device, and the same technical effect may be achieved, which will not be repeated herein to avoid repetition.

Figure 14:
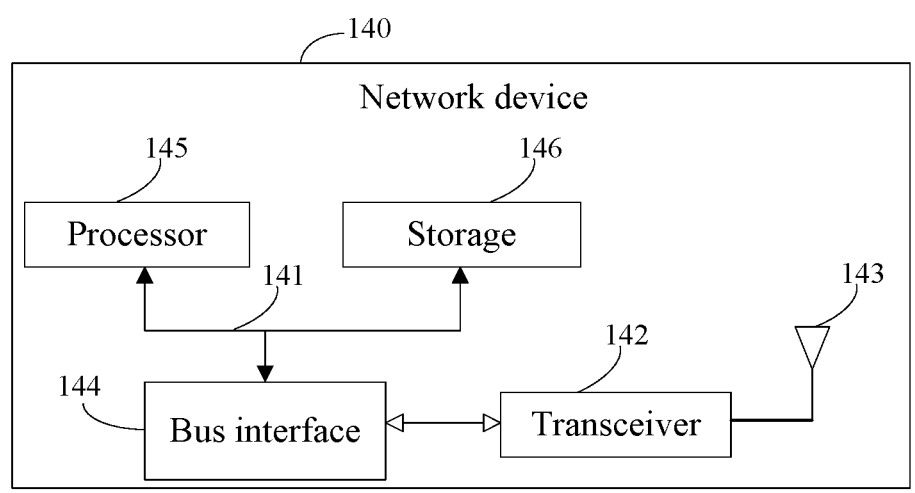
FIG. 14 is a third schematic structural diagram of a network device according to some embodiments of the present disclosure.

Specifically, FIG. 14 is a schematic diagram of a hardware structure of a network device that implements various embodiments of the present disclosure. The network device 140 includes, but is not limited to: a bus 141, a transceiver 142, an antenna 143, a bus interface 144, a processor 145, and a storage 146.

In some embodiments of the present disclosure, the network device 140 further includes: a computer program stored in the storage 146 and executable by the processor 145. In a case that the computer program is configured to be executed by the processor 145, the processor 110 is configured to implement the following steps:

sending media access control layer control element (Media Access Control layer Control Element, MAC CE) signaling to a terminal device, wherein the MAC CE signaling is used to activate a Secondary Cell (SCell);

activating a downlink semi-persistent reference signal (Semi-Persistent Reference Signal, SP RS) based on the MAC CE signaling; and sending the downlink SP RS to the terminal device according to a transmission time of the downlink SP RS, wherein the downlink SP RS is used by the terminal device to activate the SCell.

Optionally, the computer program is executed by the processor 145 to implement the following steps:

sending MAC CE signaling to a terminal device, wherein the MAC CE signaling is used to activate an SCell and an uplink SP RS;

receiving the uplink SP RS according to a transmission time of the uplink SP RS, the uplink SP RS being sent by the terminal device; and activating the SCell based on the uplink SP RS.

The transceiver 142 is used to receive and send data under control of the processor 145.

In FIG. 14, a bus architecture (represented by the bus 141) may include any number of interconnected buses and bridges. Various circuits, specifically, one or more processors represented by the processor 145 and a storage represented by the storage 146, are linked together by the bus 141. The bus 141 may also link various other circuits such as peripherals, voltage regulators and power management circuits, which are well known in the art, and therefore a further description is omitted herein. The bus interface 144 provides an interface between bus 141 and transceiver 142. The transceiver 142 may be one or more elements, e.g., multiple transmitters and multiple receivers, to provide units configured to communicate with various other apparatuses over a transmission medium. Data processed by the processor 145 is transmitted over a wireless medium through the antenna 143. Further, the antenna 143 receives the data and transmits the data to the processor 145.

The processor 145 is responsible for managing the bus 141 and general processing, and may also provide various functions including timing, peripheral interfaces, voltage regulation, power management, and other control functions. The storage 146 may store data used by the processor 145 when performing operations.

Optionally, the processor 145 may be CPU, ASIC, FPGA or CPLD.

In addition, some embodiments of the present disclosure also provides a computer readable storage medium, wherein the computer program is stored on the computer readable storage medium, and the computer program is executed by a processor to implement various processes in the foregoing cell processing method embodiments applied to a network device, and the same technical effect can be achieved, which will not be repeated herein to avoid repetition. The computer readable storage medium may be, for example, a read-only memory (Read-Only Memory, ROM), a random access memory (Random Access Memory, RAM), a magnetic disk or an optical disk, etc.

Some embodiments of the present disclosure also provides a computer readable storage medium, wherein the computer program is stored on the computer readable storage medium, and the computer program is executed by a processor to implement various processes in the foregoing cell processing method embodiments applied to a terminal device, and the same technical effect can be achieved, which will not be repeated herein to avoid repetition. The computer readable storage medium may be, for example, a read-only memory (Read-Only Memory, ROM), a random access memory (Random Access Memory, RAM), a magnetic disk or an optical disk, etc.

The storage or the computer readable storage medium in some embodiments of the present disclosure may be either a volatile storage or a non-volatile storage, or may include both the volatile storage and the non-volatile storage.

It should be noted that, in this article, the terms "comprise" or "include" or any other variations are intended to encompass a non-exclusive inclusion, such that a process, method, article, or device that includes a plurality of elements includes not only those elements but also other elements not explicitly listed, or elements that are inherent to such a process, method, article, or device. An element defined by the phrase "comprising a . . . " does not exclude the presence of additional identical elements in the process, method, article, or device that comprises the element, without further limitation.

Through the description of the foregoing embodiments, it is clear to those skilled in the art that the foregoing method embodiments may be implemented by software plus a necessary general hardware platform, and certainly may also be implemented by hardware, but in many cases, the former is a better implementation. Based upon such understanding, the technical solutions of the present disclosure essentially or a part thereof contributing to the prior art may be embodied in the form of a computer software product which may be stored in a storage medium (e.g., a ROM/RAM, a magnetic disk or an optical disk) and which includes several instructions to cause a terminal (which may be a personal computer, a server, an air-conditioner or a network device, etc.) to perform the methods described in the various embodiment of the present disclosure.

The embodiments of the present disclosure are described above with reference to the accompanying drawings, but the present disclosure is not limited to the above-mentioned specific embodiments, and the above-mentioned specific embodiments are only illustrative and not restrictive. A person skilled in the art with hints of the present disclosure may also make many forms that fall within the protection of the present disclosure without departing from the scope protected by the purposes and claims of the present disclosure.

What is claimed is:

1. A cell processing method, operable by a network device, comprising:
    sending Media Access Control layer Control Element (MAC CE) signaling to a terminal device, wherein the MAC CE signaling is used to activate a Secondary Cell (SCell);
    activating a downlink Semi-persistent Reference signal (SP RS) based on the MAC CE signaling; and
    sending the downlink SP RS to the terminal device according to a transmission time of the downlink SP RS,
    wherein the downlink SP RS is used by the terminal device to activate the SCell,
    wherein the transmission time of the downlink SP RS is related to a transmission time of the MAC CE signaling and a transmission-time offset value of the downlink SP RS, and the transmission-time offset value of the downlink SP RS is an offset value of the transmission time of the downlink SP RS relative to the transmission time of the MAC CE signaling;
    wherein the transmission-time offset value of the downlink SP RS is one of:
    a time offset value indicated by the MAC CE signaling or higher-layer signaling;
    a time offset value indicated by the MAC CE signaling, wherein the time offset value is one of multiple time offset values indicated by higher-layer signaling;
    a time offset value corresponding to a time offset index value indicated by the MAC CE signaling, wherein the time offset index value is one of multiple time offset index values indicated by higher-layer signaling; and
    a time offset value predetermined in a protocol, or
    wherein the transmission time of the downlink SP RS is one of:
    a transmission time indicated by the MAC CE signaling or higher-layer signaling;
    a transmission time indicated by the MAC CE signaling, wherein the transmission time is one of multiple transmission times indicated by higher-layer signaling;
    a transmission time corresponding to a transmission time index value indicated by the MAC CE signaling, wherein the transmission time index value is one of multiple transmission time index values indicated by higher-layer signaling; and
    a transmission time predetermined in a protocol.

2. The cell processing method according to claim 1, wherein the downlink SP RS is at least one of a Semi-persistent Tracking Reference Signal (SP TRS) and a Semi-Persistent Channel Status Indicate Reference Signal (SP CSI-RS).

3. The cell processing method according to claim 1, further comprising:
    determining a downlink Bandwidth Part (BWP) to which the downlink SP RS belongs; and
    the sending the downlink SP RS to the terminal device comprises:
    sending the downlink SP RS to the terminal device on the downlink BWP.

4. The cell processing method according to claim 3, further comprising:
    sending indication information used to indicate the downlink BWP to the terminal device.

5. A cell processing method, operable by a terminal device, comprising:
    receiving Media Access Control layer Control Element (MAC CE) signaling sent by a network device, wherein the MAC CE signaling is used to activate a Secondary Cell (SCell) and a downlink Semi-persistent Reference signal (SP RS);
    determining a transmission time of the downlink SP RS;
    receiving the downlink SP RS according to the transmission time of the downlink SP RS, the downlink SP RS being sent by the network device;
    activating the SCell based on the downlink SP RS,
    wherein the transmission time of the downlink SP RS is related to a transmission time of the MAC CE signaling and a transmission-time offset value of the downlink SP RS, and the transmission-time offset value of the downlink SP RS is an offset value of the transmission time of the downlink SP RS relative to the transmission time of the MAC CE signaling,
    wherein the transmission-time offset value of the downlink SP RS is one of:
    a time offset value indicated by the MAC CE signaling or higher-layer signaling;
    a time offset value indicated by the MAC CE signaling, wherein the time offset value is one of multiple time offset values indicated by higher-layer signaling;
    a time offset value corresponding to a time offset index value indicated by the MAC CE signaling, wherein the time offset index value is one of multiple time offset index values indicated by higher-layer signaling; and
    a time offset value predetermined in a protocol.

6. The cell processing method according to claim 5, wherein the downlink SP RS is at least one of a Semi-persistent Tracking Reference Signal (SP TRS) and a Semi-Persistent Channel Status Indicate Reference Signal (SP CSI-RS).

7. The cell processing method according to claim 5, wherein the transmission time of the downlink SP RS is one of:
    a transmission time indicated by the MAC CE signaling or higher-layer signaling;
    a transmission time indicated by the MAC CE signaling, wherein the transmission time is one of multiple transmission times indicated by higher-layer signaling;
    a transmission time corresponding to a transmission time index value indicated by the MAC CE signaling, wherein the transmission time index value is one of multiple transmission time index values indicated by higher-layer signaling; and
    a transmission time predetermined in a protocol.

8. The cell processing method according to claim 5, further comprising:
    receiving indication information sent by the network device, wherein the indication information is used to indicate a downlink Bandwidth Part (BWP) to which the downlink SP RS belongs; and
    the receiving the downlink SP RS sent by the network device comprises:
    receiving the downlink SP RS on the downlink BWP.

9. A cell processing method, operable by a terminal device, comprising:

receiving Media Access Control layer Control Element (MAC CE) signaling sent by a network device, wherein the MAC CE signaling is used to activate a Secondary Cell (SCell);

activating an uplink Semi-persistent Reference signal (SP RS) based on the MAC CE signaling;

determining a transmission time of the uplink SP RS; and sending the uplink SP RS to the network device according to the transmission time of the uplink SP RS, wherein the uplink SP RS is used by the network device to activate the SCell, wherein the transmission time of the uplink SP RS is related to a transmission time of the MAC CE signaling and a transmission-time offset value of the uplink SP RS, and the transmission-time offset value of the uplink SP RS is an offset value of the transmission time of the uplink SP RS relative to the transmission time of the MAC CE signaling, wherein the transmission-time offset value of the uplink SP RS is one of:

a time offset value indicated by the MAC CE signaling or higher-layer signaling;

a time offset value indicated by the MAC CE signaling, wherein the time offset value is one of multiple time offset values indicated by higher-layer signaling;

a time offset value corresponding to a time offset index value indicated by the MAC CE signaling, wherein the time offset index value is one of multiple time offset index values indicated by higher-layer signaling; and a time offset value predetermined in a protocol.

10. The cell processing method according to claim 9, wherein the uplink SP RS is a Semi-persistent Sounding Reference Signal (SP SRS).

11. The cell processing method according to claim 9, wherein the transmission time of the uplink SP RS is one of:

a transmission time indicated by the MAC CE signaling or higher-layer signaling;

a transmission time indicated by the MAC CE signaling, wherein the transmission time is one of multiple transmission times indicated by higher-layer signaling;

a transmission time corresponding to a transmission time index value indicated by the MAC CE signaling, wherein the transmission time index value is one of multiple transmission time index values indicated by higher-layer signaling; and a transmission time predetermined in a protocol.

12. The cell processing method according to claim 9, further comprising:

determining an uplink Bandwidth Part (BWP) to which the uplink SP RS belongs;

the sending the uplink SP RS to the network device comprises:

sending the uplink SP RS to the network device on the uplink BWP.

13. The cell processing method according to claim 12, further comprising:

sending to the network device indication information used to indicate the uplink BWP.

14. A network device, comprising:

a storage, a processor and a computer program stored in the storage and configured to be executed by the processor, wherein, when the processor executes the computer program, the processor implements steps of the cell processing method according to claim 1.

15. A terminal device, comprising:

a storage, a processor and a computer program stored in the storage and configured to be executed by the processor, wherein, when the processor executes the computer program, the processor implements steps of the cell processing method according to claim 5.

16. The terminal device according to claim 15, wherein the downlink SP RS is at least one of a Semi-persistent Tracking Reference Signal (SP TRS) and a Semi-Persistent Channel Status Indicate Reference Signal (SP CSI-RS).

17. The terminal device according to claim 15, wherein the transmission time of the downlink SP RS is one of:

a transmission time indicated by the MAC CE signaling or higher-layer signaling;

a transmission time indicated by the MAC CE signaling, wherein the transmission time is one of multiple transmission times indicated by higher-layer signaling;

a transmission time corresponding to a transmission time index value indicated by the MAC CE signaling, wherein the transmission time index value is one of multiple transmission time index values indicated by higher-layer signaling; and a transmission time predetermined in a protocol.

18. A terminal device, comprising:

a storage, a processor and a computer program stored in the storage and configured to be executed by the processor, wherein, when the processor executes the computer program, the processor implements steps of the cell processing method according to claim 9.

19. The terminal device according to claim 18, wherein the uplink SP RS is a Semi-persistent Sounding Reference Signal (SP SRS).

20. The terminal device according to claim 18, wherein the transmission time of the uplink SP RS is one of:

a transmission time indicated by the MAC CE signaling or higher-layer signaling;

a transmission time indicated by the MAC CE signaling, wherein the transmission time is one of multiple transmission times indicated by higher-layer signaling;

a transmission time corresponding to a transmission time index value indicated by the MAC CE signaling, wherein the transmission time index value is one of multiple transmission time index values indicated by higher-layer signaling; and a transmission time predetermined in a protocol.

* * * * *